(12) United States Patent
Ye et al.

(10) Patent No.: US 11,032,158 B1
(45) Date of Patent: Jun. 8, 2021

(54) COMPUTERIZED SYSTEMS AND METHODS FOR PROCESSING HIGH-VOLUME LOG FILES FROM VIRTUAL SERVERS

(71) Applicant: Coupang, Corp., Seoul (KR)

(72) Inventors: Jun Ye, San Carlos, CA (US); Chul Seo, San Carlos, CA (US)

(73) Assignee: Coupang Corp., Seoul (KR)

(*) Notice: Subject to any disclaimer, the term of this patent is extended or adjusted under 35 U.S.C. 154(b) by 0 days.

(21) Appl. No.: 16/951,133

(22) Filed: Nov. 18, 2020

(51) Int. Cl.
*H04L 12/24* (2006.01)
*G06F 40/205* (2020.01)

(52) U.S. Cl.
CPC ............ *H04L 41/22* (2013.01); *G06F 40/205* (2020.01); *H04L 41/14* (2013.01)

(58) Field of Classification Search
CPC ........ H04L 41/22; H04L 41/14; G06F 40/205
See application file for complete search history.

(56) References Cited

U.S. PATENT DOCUMENTS 10,417,102 B2 * 9/2019 Sanakkayala ........... H04L 43/10

\* cited by examiner

*Primary Examiner* — Kristie D Shingles
(74) *Attorney, Agent, or Firm* — Finnegan, Henderson, Farabow, Garrett & Dunner LLP (57) ABSTRACT

A system for live analysis of testing logs. The system including a memory and a processor configured to execute the instructions to perform operations including receiving a plurality of log entries; processing the plurality of log entries; storing the processed plurality of log entries in a database having an inverted index; receiving a query from a user device; returning test data, metadata, and statistics related to the one or more log entries; displaying the test data, the metadata, and the statistics on a GUI; comparing an exposure ratio to a range, the exposure ratio being based on a first amount of log entries associated with a first test version and a second amount of log entries associated with a second test version; and upon determining the exposure ratio is outside of the range, directing all requests from subsequent test users to a default test version.

20 Claims, 5 Drawing Sheets

Live Log UI in Experiment Center – Latest Logs 402

Overview | Live | Results | Details | History     View Less ∧

Enter PCID or UUID to start 412 streaming A/B exposure logs... 🔍   ⟳ Refresh Exposure Logs

408

| Timestamp | User ID | Group | Tag Details |
|---|---|---|---|
| 08/20 06:05:49 KST | 1475766130 | B | Platform: IOS [15] |
| 08/20 06:05:40 KST | 1550205481 | A | Platform: IOS [15] |
| 08/20 06:05:38 KST | 1525683415 | A | Platform: IOS [15] |
| 08/20 06:05:38 KST | 1488971389 | B | Platform: IOS [15] |
| 08/20 06:05:35 KST | 1531361447 | B | Platform: IOS [15] |
| 08/20 06:05:35 KST | 1512724181 | B | Platform: IOS [15] |
| 08/20 06:05:32 KST | 1579716439 | B | Platform: IOS [15] |

Expected Traffic And Logging Condition

Rocket Fresh Customers | Any Fresh Home Visitor

410

Exposed Customers | Customers | Logs   6 hr ▼

404

Tag Details
------
- Pcid    15154730326:
- MemberSrl    111
- Platform    IOS
- HostAddress    I-0ebd7a34ab81eb04f
- ClientAddress    10.211.88.158
- AppVersion    6.0.9
- OsName    IOS
- OsVersion    13.6
- SessionId    1WPiX9-Eg5cnxqDx5uLNstiSi29L6nZHxbCHCYaVXeqt30sBOJ3YNqHNI
- DeviceId    2AAEDEA1-2997-47DB-B739-1006A49AA264
- Resolution    IPHONE_3X
- AccessToken    OzOpPpVt5m2ZQkIWGZVsOS92kb1kp4X7AGwuLGdiL7cLggJ5HYvrBeH/WffP
- Adult
- Referrer    /Pip
- Role

Streaming A/B Logs in Real-Time 406

Overview | Live | Results | Details | History

15154730326351124141014    ×    ⏸ Pause Streaming ↻

| Timestamp | User ID | Group | Tag Details |
|---|---|---|---|
| 08/20 06:19:05 KST | 15154730326351124141014 | B | Platform: IOS [15] |

FIG. 4

COMPUTERIZED SYSTEMS AND METHODS FOR PROCESSING HIGH-VOLUME LOG FILES FROM VIRTUAL SERVERS

TECHNICAL FIELD

The present disclosure generally relates to computerized systems and methods for processing high-volume log files from virtual servers. In particular, embodiments of the present disclosure generally relate to inventive and unconventional systems for processing large numbers of log files from virtual servers by receiving a plurality of log entries comprising test data and metadata. The log entries may be an A/B test user exposure log. These logs log who was exposed to which test at what time and under what conditions as well as some metadata. Embodiments of the present disclosure also relate to comparing an exposure ratio to a range and directing requests from a consumer device a default test version as the requests are received.

BACKGROUND

Numerous computerized systems for processing log files from virtual servers and running A/B tests to analyze website hosting exist.

A/B tests are useful for understanding user engagement and satisfaction of online features, such as a new feature or product. Websites utilize NB testing to create a more successful user experience as well as a method to streamline their services. Some NB tests are used to determine how online services affect user actions and determine how users influence one another. In some instances, data from NB tests enable companies to understand growth, increase revenue, and optimize customer satisfaction, such as in the online retail industry, for example. NB tests are also used to see how a website performs functionally, i.e., does the website have a lot of memory usage, does the website crash frequently, does the website have a lot of processor usage, is the website costly to operate because it uses more processor capability.

Proliferation of virtual servers has broadened access to large computing resources at low costs. Various corporations provide virtual server resources, also known as cloud computing. Further, companies, universities, and government organizations utilize virtual servers to host websites, perform complex computer simulations, and store large databases, among other services. Virtual servers provide secure, reliable, and scalable computational resources to clients, enabling clients to focus on creating products rather than maintaining server capability.

However, organizations consuming large amounts of virtual server resources often have difficulty, when using these traditional systems, when a developer is conducting an A/B test (e.g., comparing version A of a website to version B of a website). Specifically, the developer must wait a prolonged period before seeing if both versions are running. It may take a developer 15+ minutes to learn that version A of a website crashes, or that the server is not directing traffic to version A. Further, developers using conventional systems are unable to dynamically alter code in real-time. Conventional systems are often not equipped to allow a developer to see exposure rates on the fly, so the developer cannot step in and fix code immediately without waiting. Furthermore, prior systems for A/B testing offer only post-interaction analysis (e.g., after an NB test is over).

Accordingly, there is a need for a system for NB testing that is capable of enabling developers to step in and fix code immediately without waiting, i.e., near real-time viewing of NB logging. Further, what is needed is a system where a developer can check to see if both versions of the website are running in real-time. Further, what is needed are improved methods and systems for allowing developers to dynamically alter code in real-time. Such a system would increase efficiency, cut down on bugs and logging errors, and ultimately provide benefits to the consumer as well.

SUMMARY

One aspect of the present disclosure is directed to a computer-implemented system for live analysis of virtual server logs. The system may include a memory and a processor configured to execute instructions to perform operations. The operations may include receiving a plurality of log entries comprising test data and metadata created based on requests sent by consumer devices; processing the plurality of log entries, wherein processing the plurality of log entries comprises determining test versions corresponding to the plurality of log entries based on the test data; storing the processed plurality of log entries in a database having an inverted index; comparing an exposure ratio to a range, the exposure ratio being based on a first amount of log entries associated with a first test version and a second amount of log entries associated with a second test version, and the range comprising a target ratio; and upon determining the exposure ratio is outside of the range, directing at least one request from a consumer device to a default test version.

Another aspect of the present disclosure is directed to a method for live analysis of virtual server logs. The method may perform operations including receiving a plurality of log entries comprising test data and metadata created based on requests sent by consumer devices; processing the plurality of log entries, wherein processing the plurality of log entries comprises determining test versions corresponding to the plurality of log entries based on the test data; storing the processed plurality of log entries in a database having an inverted index; comparing an exposure ratio to a range, the exposure ratio being based on a first amount of log entries associated with a first test version and a second amount of log entries associated with a second test version, and the range comprising a target ratio; and upon determining the exposure ratio is outside of the range, directing at least one request from a consumer device to a default test version.

Yet another aspect of the present disclosure is directed to a method. The method may include receiving a plurality of log entries from a plurality of virtual server providers performing an NB test on test users, the plurality of log entries corresponding to virtual servers and comprising a virtual server identifier and an event identifier; processing the plurality of log entries, wherein processing the plurality of log entries comprises determining which of an A test version or a B test version is running on each virtual server; storing the processed plurality of log entries in a database having an inverted index; constructing a query to determine a first number of A test version events of a type and a second number of B test version events of the type; comparing an event ratio to a range, the event ratio being a ratio of the first number over the second number, and the range including a target ratio; and upon determining the event ratio is outside of the range, directing at least one request from a consumer device to a default test version.

Other systems, methods, and computer-readable media are also discussed herein.

DETAILED DESCRIPTION

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to computerized systems and methods configured for processing high-volume log files from virtual servers and systems and methods capable of dynamically enabling developers to adjust exposure rates on the fly, so they can step in and fix code immediately without waiting, i.e., near real-time viewing of A/B logging. For example, the present systems enable storage and live monitoring of A/B activity in real-time, cutting down on bugs and logging errors, and provides a near-real-time detailed review of NB logging (2-3 second latency). Further, the present disclosure is related to systems and methods where a developer can check to see if both versions of the website are running in real-time. The present systems and methods increase efficiency, cut down on bugs and logging errors, and ultimately provide benefits to consumers.

Figure 1A:
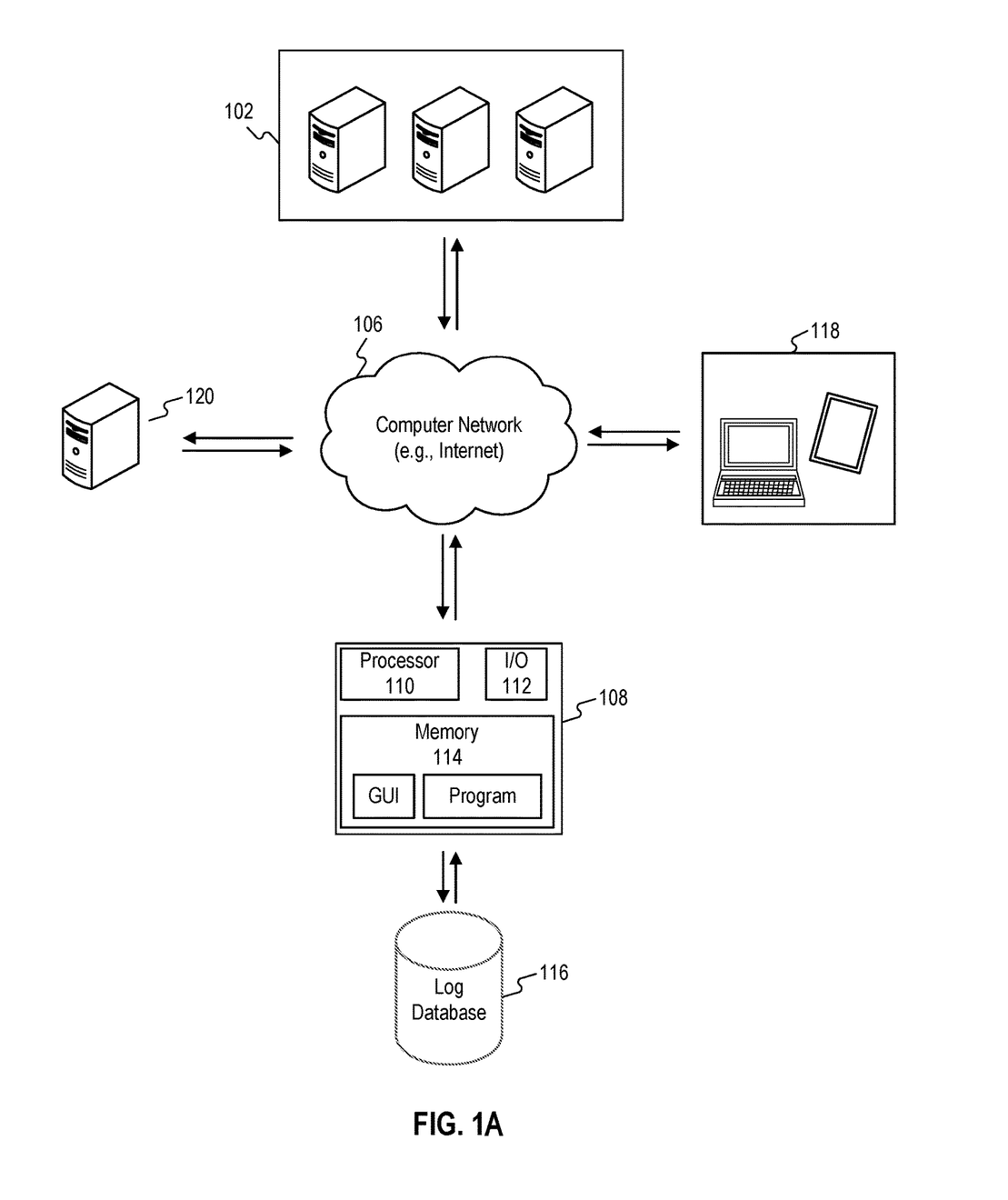
FIG. 1A is a schematic block diagram illustrating an exemplary embodiment of a network comprising computerized systems for communications, consistent with the disclosed embodiments.

FIG. 1A is a schematic block diagram illustrating an exemplary embodiment of a network comprising computerized systems for communications, consistent with the disclosed embodiments. The architecture and particular modules depicted in FIGS. 1A, 1B, and 3, and the particular order and steps in FIG. 2, are merely exemplary.

FIG. 1A shows a network 100 including a virtual server provider 102. Virtual server provider 102 may include a plurality of virtual servers that report their log entries to system 108 (via network 106), which then may process and store the log entries in log database 116. Developer computer 120 may access system 108 via 106 to set up test details and view test results related to an NB test (e.g., a test to see how different versions of a website or web page performs functionally). Consumer devices 118 may access websites and other resources of the virtual servers. In some embodiments, a test may comprise more than two possible versions (e.g., A/B/C test).

Consistent with the disclosure, log entries may be messages about server processing and may include at least a timestamp, virtual server identifier, user identifier, device type, error code, or event type (e.g., "received a request from an IP address," "sent data to an IP address," "acknowledged receipt of request," "error state," or "report of the measurement"). In other embodiments, log entries may store additional or alternative information relating to server processing.

Developer computer 120 may be used by a developer conducting the NB tests. In contrast, consumer devices 118 may be used by users who are using a website and going shopping, for example. In some embodiments, there are many different users accessing different versions of the website.

System 108 includes at least one processor 110, an input/output (I/O) device 112 that allows data to be transmitted, and at least one memory 114. The memory 114 stores a program for processes described in FIGS. 2 and 3.

Furthermore, processor 110 may be a generic or specific electronic device capable of manipulating or processing information. For example, the processor may include any combination of any number of a central processing unit (or "CPU"), a graphics processing unit (or "GPU"), an optical processor, a programmable logic controllers, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), and any type of circuit capable of data processing. The processor may also be a virtual processor that includes one or more processors distributed across multiple machines or devices coupled via a network.

Additionally, the memory 114 may be a generic or specific electronic device capable of storing codes and data accessible by the processor (e.g., via a bus, not shown). For example, the memory may include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or any type of storage device. The codes may include an operating system (OS) and one or more application programs (or "apps") for specific tasks. The memory may also be a virtual memory that includes one or more memories distributed across multiple machines or devices coupled via a network.

System 108 is connected to a computer network 106. For example, computer network 106 may include any combination of one or more of the Internet, an Intranet, a Local-Area Network (LAN), a Wide-Area Network (WAN), a Metropolitan-Area Network (MAN), a virtual private network (VPN), a wireless network (e.g., compliant with IEEE 802.11a/b/g/n), a wired network, a leased line, a cellular data network, and a network using Bluetooth connections, infrared connections, or Near-Field Communication (NFC) connections.

System 108 is further connected, either directly or via computer network 106, to consumer devices 118, developer computer 120, and virtual server provider 102. Consumer devices 118 may be one or more laptops, desktop computers, mobile phones, or the like. A user may send virtual server resource requests, such as a request for a web page hosted by a virtual server 102, through consumer devices 118 to system 108. Developer computer 120 may be one or more laptops, standalone computers, mobile phones, and the like. A developer may send virtual server resource requests through developer computer 120 to system 108. Consumer devices 118 may be one or more laptops, standalone computers, mobile phones, and the like.

Figure 1B:
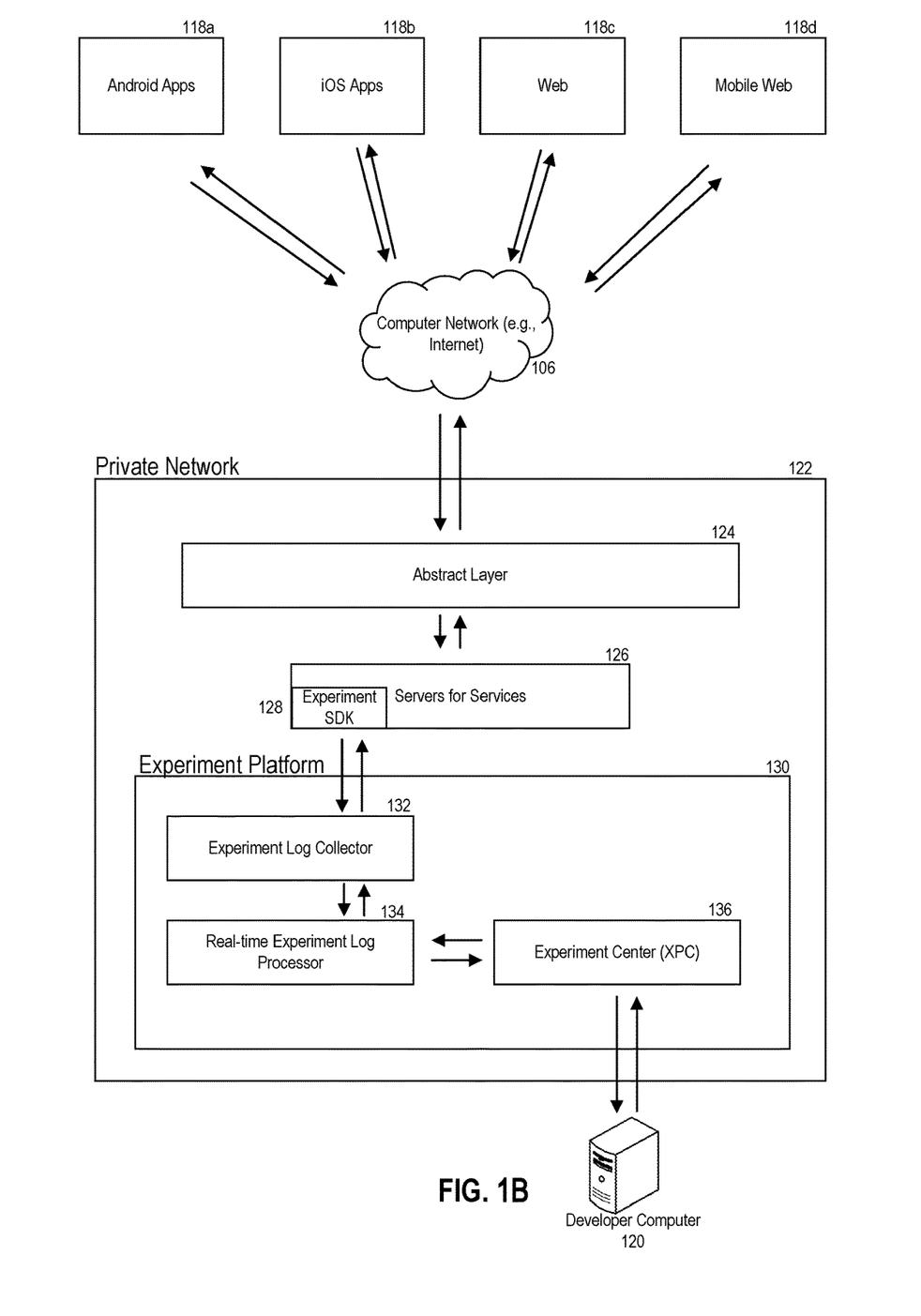
FIG. 1B is a schematic block diagram illustrating an exemplary embodiment of a system for analysis of virtual server logs, consistent with the disclosed embodiments.
Figure 2:
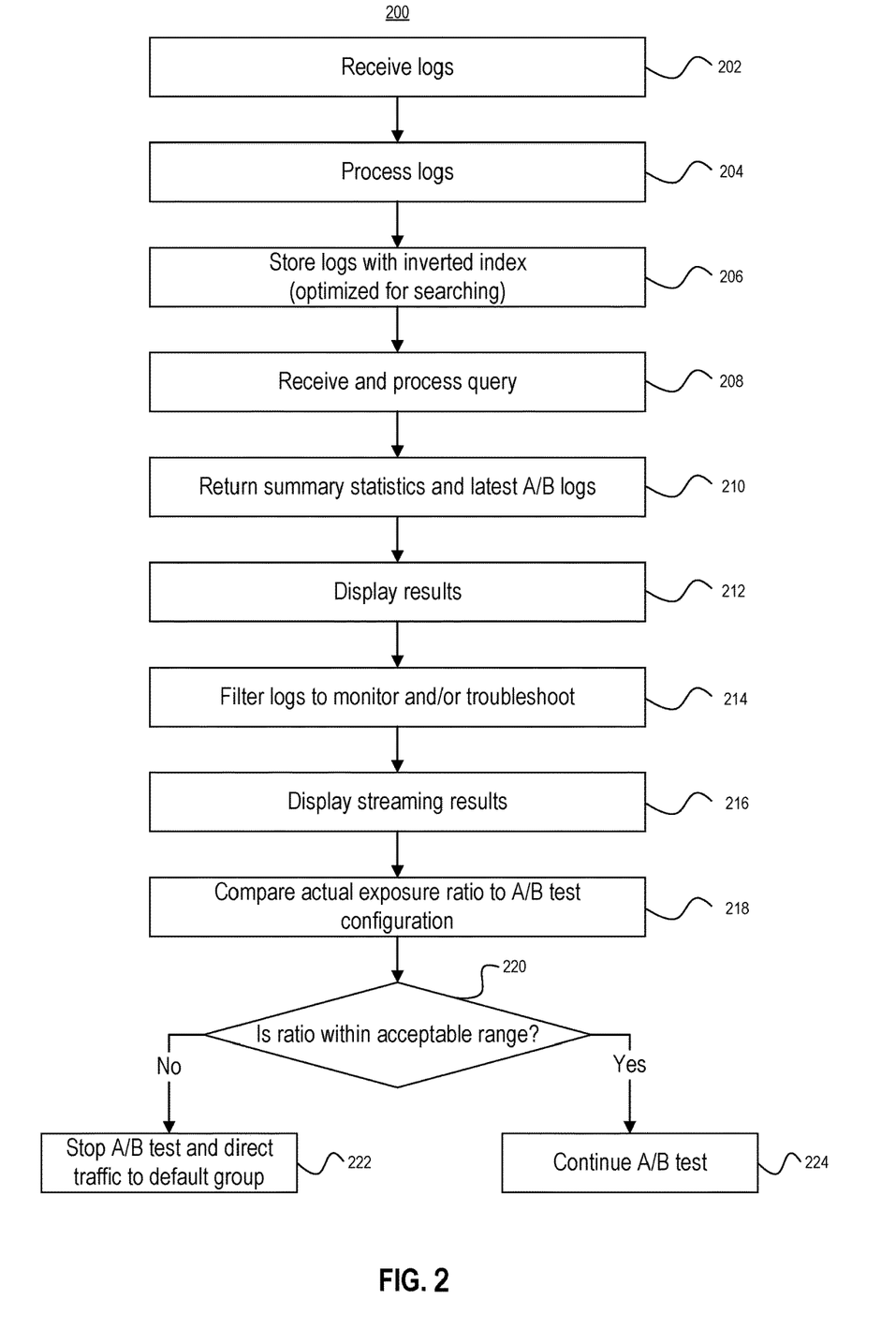
FIG. 2 is a flowchart illustrating an exemplary method for analysis of virtual server logs, consistent with the disclosed embodiments.

FIG. 1B is a schematic block diagram illustrating an exemplary embodiment of a system for live analysis of virtual server logs, consistent with the disclosed embodiments. FIG. 1B shows network 101 including a private network 122, which may be hosted by virtual server provider 102, and an experiment platform 130. Private network 122 may include an abstract layer 124, one or more servers for services 126 which may include an experiment SDK 128, and experiment platform 130 which may include an experiment log collector 132, a real-time experiment log processor 134, and an experiment center (XPC) 136. Private network 122 may receive user data from consumer portals 118*a-d* through computer network 106. XPC 136 may be accessed by developers through developer computer 120.

In some embodiments, experiment log collector 132 and real-time experiment log processor 134 may be programs stored in memory 114 and XPC 136 may represent the GUI in memory 114. Processor 110 may be able to execute the programs and GUI to perform method 200, as discussed in greater detail below.

In some embodiments, abstract layer 124 may receive requests from consumer portals 118*a-d*, direct the requests to an appropriate server in servers for services 126, and aggregate responses. Experiment SDK 128 may then create logs from the consumer requests sent to servers for services 126 and send the logs to system 108 when executing experiment log collector 132 in experiment platform 130. Abstract layer 124 is not required in all embodiments.

Processor 110 may execute experiment log collector 132 to receive logs from experiment SDK 128. Processor 110 may then execute real-time experiment log processor 134 to process logs for consumption and store the processed logs in a manner which is optimized for searching, as discussed in greater detail below. Processor 110 executes real-time experiment log processor 134 and XPC 136 to provide NB logs in real-time to a developer using developer computer 120, as discussed in greater detail below.

XPC 136 may provide a developer with a user interface with advanced viewing capabilities of log data enabling viewing on a single user basis. For example, XPC 136 may enable viewing of logs as soon as they are processed by processor 110, a replay of raw log details, e.g., seeing a timeline and simulation (playback) of logged activity, or other configurations for the viewing of logs.

FIG. 2 is a flowchart illustrating an exemplary method for live analysis of virtual server logs used by the systems and methods described herein, consistent with the disclosed embodiments. While the exemplary method 200 is described herein as a series of steps, it is to be understood that the order of the steps may vary in other implementations. In particular, steps may be performed in any order, or in parallel.

At step 202, processor 110 may execute experiment log collector 132 to receive a plurality of log entries comprising test data and metadata from experiment SDK 128 via private network 122. Consistent with the disclosure, log entries include at least a timestamp, virtual server identifier, user identifier, device type, error code, or event type. In some embodiments, the plurality of log entries may include one or more A/B test user exposure logs. In such embodiments, the one or more log entries may log data providing who was exposed to which test (e.g., NB test information, test ID, or key), under what condition, at what time (e.g., date and time when the user was exposed), and assigned to which group (e.g., A, B, or C, option), metadata (e.g., software version), or the like. In some embodiments, step 202 may be performed using a messaging platform or stream processing platform such that the logs are received from a data feed or channel. Such a platform includes, for example, Apache Kafka.

In some embodiments, the log entries identify the one or more customers that were exposed to the A/B test while using a version of a website by identifying and providing a customer's internal website user ID (e.g., "userId," "PCID," and "memberSRL").

In some embodiments, the log entries identify what condition is the user's environment when exposed. e.g. platform such as application version and host address.

Figure 3:
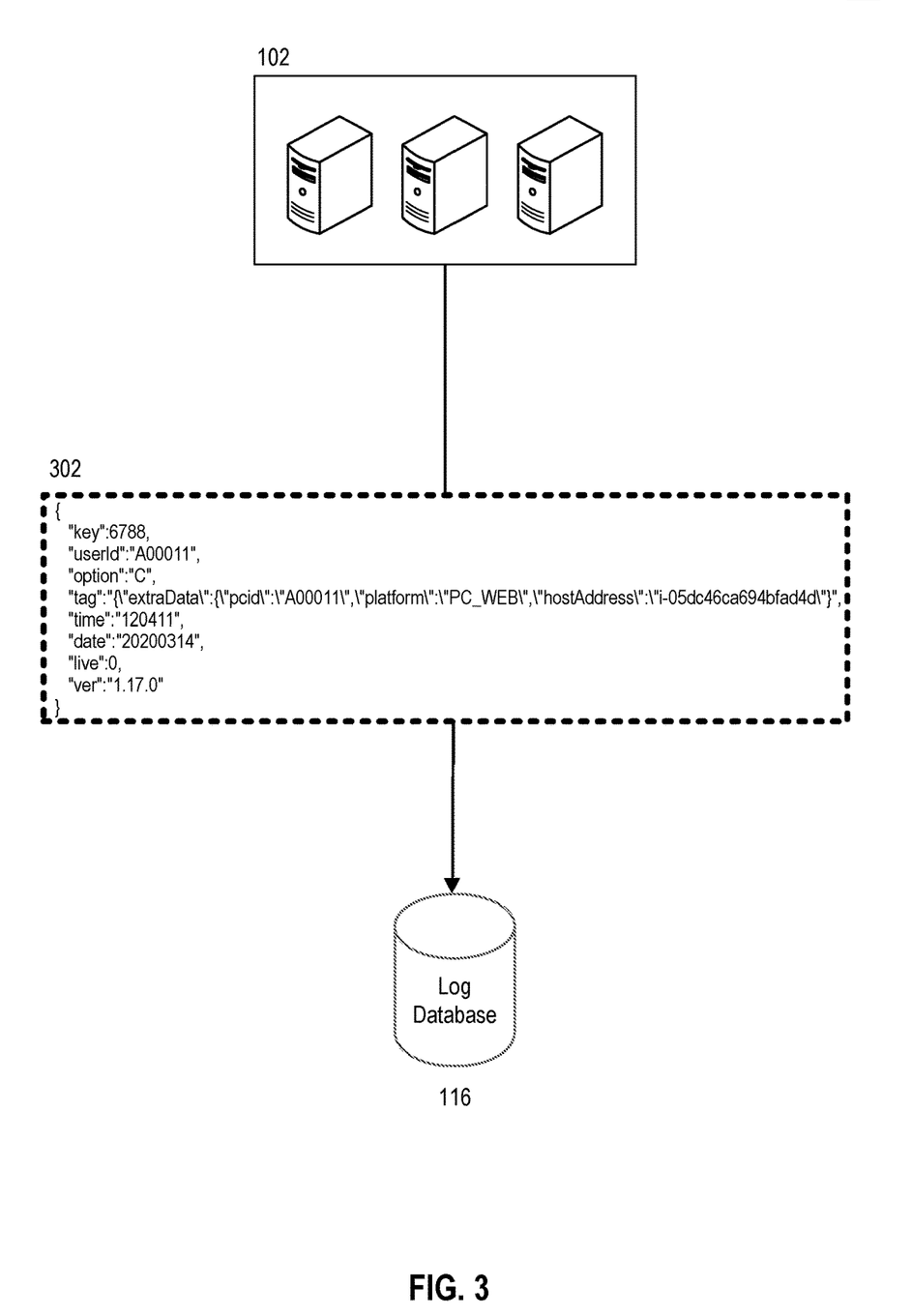
FIG. 3 is a schematic block diagram illustrating an exemplary embodiment of a network comprising a computerized system receiving, processing, and indexing log files, consistent with the disclosed embodiments.

Processor 110 may also receive a performance measurement such as a discrete event like "error" or "received" or "acknowledged" but the performance measurement may also be a status. For example, a log entry is a virtual server indicating what function the virtual server is performing, e.g., "received a request from an IP address," "sent X data to an IP address," "acknowledged receipt of request," "error state," or "reported the measurement." In some embodiments, examples of log entries comprise performance measurements of a plurality of virtual servers including a log entry indicating "return to website," "currently using 90% of processor capability," or "currently using 80% of storage." In some embodiments, event type comprises a recorded purchase, and the operations further comprise determining a total purchase amount corresponding to a user identifier and time range and appending the total purchase amount to the log entry. An example of a log entry received by processor 110 is shown in FIG. 3 (described below).

At step 204, processor 110, via method 200, may process logs for consumption by executing real-time experiment log processor 134. Processing logs for consumption may refer to determining test versions corresponding to the plurality of log entries based on the test data, parsing the received logs and extracting relevant data from the received logs, the relevant data being determined by an NB test configuration set by the developer, and presenting the extracted data in a format readable by the XPC 136 as processed logs. In some embodiments, step 204 may be performed using a server-side data processing pipeline. Such a pipeline includes, for example, Logstash.

At step 206, processor 110, via method 200, may store the processed logs in a database having an inverted index. In some embodiments, step 206 may be performed using a search engine such that the logs are stored in a database having an inverted index. Such an engine includes, for example, Elasticsearch.

When storing the processed logs in the inverted index such as a database index, processor 110 may store a mapping from content, such as the processed logs, to its locations in a table, or in a document or a set of documents (in contrast to a forward index, which maps from documents to content). However, in some embodiments, processor 110 may store the processed logs in a forward index.

Every processed log from step 210 may be saved in an inverted index in log database 116. When processed logs are saved in an inverted index, processor 110 may process queries coming from developer computer 120 in a timely and efficient manner.

At step 208, processor 110 may receive and process one or more queries. Processor 110 may receive the one or more queries through a developer using developer computer 120 to access XPC 136. Processor 110 may then execute real-time experiment log processor 134 to process the one or more queries, i.e., determine which data in what logs the developer is calling for and extract the determined data from the appropriate logs.

At step 210, processor 110 may return summary statistics and latest A/B logs after processing the query. Summary statistics may refer to different ways of presenting the extracted data, such as graphs, tables, and the like, comparing the logs for test A and test B. Latest NB logs may refer to either the raw or processed logs which may be displayed individually or grouped by a predetermined or developer-selected category. In some embodiments, steps 208 and 210 may be performed using a distributed search engine. Such an engine includes, for example, Elasticsearch.

At step 212, processor 110 may display the summary statistics, the latest A/B logs, and any other results from the query on XPC 136.

Optionally, at steps 214 and 216, processor 110 may filter logs based on a request received through XPC 136 from a developer to monitor and/or troubleshoot and then display the results from the request live. XPC 136 may allow the developer to set up controlled experiments and troubleshoot the experiments. The developer may use XPC 136 to see live results to modifications to the A/B test, and, as such, learn more about the NB test. XPC 136 may be a single place where all experiments may be housed. For example, using XPC 136, a developer may see details of a test, metadata, setup info, where the test is running, results metric calculations, images of the set up, and other data relating to the NB test. In some embodiments, XPC 136 may be a desktop application connected to the internet.

In some embodiments, a user may access a homepage with a test on the homepage of a website. Processor 110 may receive information related to when the user was exposed to the test, i.e. exposure information. In some embodiments, the platform of the website (homepage accessed by the user), stored on virtual server provider 102, for example, may be built in a specific scope—everything functions only in the limits of NB testing code. Using live analysis, developers may be able to understand how a user reacts or measure other metrics by using collected data. Real-time log functionality provides the ability to see one's own logs in real-time, and determine whether an experiment is implemented correctly, coded correctly, whether there are bugs in the experiment design and implementation, what kind of devices are using it. An A/B Test log may include the data depicted in FIG. 3, such as:

{
"key":6788,
"userId":"A00011",
"option":"C",
"tag":"{VextraDatarrpcid\":"\A00011\",\"platform\":
\"PC_WEB\",\"hostAddr ess\":\"i-05dc46ca694bfad4d\"}",
"time":"120411",
"date":"20200314",
"live":0,
"ver":"1.17.0"
}

In such embodiments, the one or more log entries may log data providing who was exposed to which test (e.g., "key": 6788), under what condition, at what date and time was the user exposed (e.g., "time":"120411" and "date": "20200314"), and assigned to which group (e.g., "option": "C"), metadata (e.g., software version "ver":"1.17.0"), or the like.

In some embodiments, the log entries identify the one or more customers that were exposed to the A/B test while using a version of a website by identifying and providing a customer's internal website user ID (e.g., "userId": "A00011").

In some embodiments, the log entries identify what condition is the user's environment when exposed. e.g. platform such as application version ("ver":"1.17.0") and host address ("tag":"{\"extraDatarrpcid\":\"A00011\",\"platform\":\"PC_WEB\",\"hostAddress\":\"i-05dc46ca694bfad4d\"}",).

In some embodiments, the terms of the inverted index comprise user identifiers, and the documents of the inverted index comprise remaining items of a corresponding log entry.

At step 218, processor 110 may compare an actual exposure ratio to the A/B test configuration. The actual exposure ratio may refer to the ratio at which users in the NB test are being exposed to either test A or test B. (In other embodiments, the ratio may indicate more than two tests, such as test A, test B, and test C.) The actual exposure ratio may be a ratio of users which fully or partially participated in the NB test. For example, if 55 users saw version A of a website and 45 users saw version B of the website, the actual exposure ratio would be 55/45. Meanwhile, the NB test configuration, in this case, may refer to exposure ratio determined in the configuration of the NB test. For example, a developer may set an A/B test to have a configured exposure ratio of 50/50, 75/25, 100/0, or any other such combination.

In order to compare the actual exposure ratio to the NB test configuration, processor 110 may construct a query (e.g., a SQL query) for sending to log database 116 to determine numbers of users exposed to the test versions (either test A or test B). Processor 110 may run a query to recall all the data regarding the number of users. In some embodiments, the query may inquire for log database 116 to, for example, show every log entry for test A and show every log entry corresponding to test B. As a result, processor 110 may determine the ratio of exposure from the number of entries for each test.

At step 220, processor 110 may determine whether the actual exposure ratio is within an acceptable range based on the comparison. The acceptable range may be predetermined or set by the developer and may include a target ratio. In some embodiments, a developer may be interested in a ratio of test A/test B. In another embodiment, a developer may be interested in a ratio of test A/test C. In yet another embodiment, a developer may be interested in a ratio of test A/(test A+test B+test C).

In some embodiments, a developer may desire a 50/50 split+/−3%, for example. Any split that is within the range of a 50/50 split+/−3% would satisfy the requirements of the system. In such an embodiment, there may be several users that see version A of a website and a number of consumers that see version B of a website. There may be a sequence of events where several servers are hosting those websites and one server is designated to be version B of a website and that version gets more users, for example. So, now the ratio is outside of what the developer was hoping to have and is a 70/30 split, for example. This ratio (70/30 split) needs to be corrected and shifted back to a 50/50 split.

Upon determining the ratio is not within the acceptable range, method 200 may proceed to step 222, where processor 110 may stop the A/B test and direct all traffic coming from users to a default group. The default group may be predetermined or set by the developer and may refer to test A, test B, or a version of the element being tested which existed before either test A or test B. Directing all traffic coming from users to a default group may refer to sending a request to experiment SDK 128 to show all future users who were going to participate in the A/B test the same default group. Conversely, if processor 110 determines the ratio is within the acceptable range, method 200 may proceed to step 224, where the NB test is allowed to continue and processor 110 may continue performing the steps outlined above.

The steps described in FIG. 2 are not merely, receive data, process data, display data, the steps also describe comparing exposure ratio to a range and directing requests according to the routing ratio. For example, when a developer wants a 50/50 split, the system may monitor the exposure ratio, and if the exposure ratio is outside of 50/50+/−10%, for example, the system may stop and redirect traffic.

FIG. 3 is a schematic block diagram illustrating an exemplary embodiment of a network comprising a computerized system receiving log files, consistent with the disclosed embodiments.

Consistent with this disclosure, in FIG. 3 virtual server provider 102 may produce log entry 302. Accordingly, processor 110 may receive log entry 302, process log entry 302, and index log entry 302 via method 200 described with respect to FIG. 2. So, log entry 302, after it has been indexed, is formatted in such a way that XPC 136 may comprehend. Then, log 308 is stored in log database 116.

In some embodiments, the operations further comprise constructing a query comprising a device type, retrieving log history from the database corresponding to the query, determining an error code frequency for software versions in the retrieved log history, and directing requests originating from a user device belonging to the device type to virtual servers operating a second test version when the error code frequency for a first test version exceeds a threshold, e.g., testing that different websites work effectively with different user devices. In some embodiments, if there is a mobile version of a website and Apple iPhone users have a problem accessing the website, it is necessary for developers to know as soon as possible that all Apple iPhone users cannot access version A of the website.

First, the log entry reports the type of user device that is being used and indicates an error message. Then, processor 110 may make a query requesting all of the log entries for iPhones. Processor 110 would retrieve that log history which displays a series of error codes, for example. In response, every log entry that processor 110 receives corresponding to iPhones shows that there was an error in displaying the webpage. This means that nobody using an iPhone can access the website which is detrimental to sales operations. If processor 110 determines that there is an error ratio that is higher than a predetermined value, the system may direct requests to another test version, e.g., all iPhones will be directed to the version of the website that actually work for iPhones.

In some embodiments, the operations further comprise receiving an indication that a live analysis of the plurality of log entries for a role is not desired, determining a set of identifiers of virtual servers operating a software version corresponding to the role, deleting the plurality of log entries having an identifier among the set of identifiers. In some embodiments, there are so many log entries that it is bogging down the analysis system. As a result, the developer may not be interested in one version of the website anymore and might not want to receive log entries associated with that version of the website because it is slowing down another process or the database is getting full. Thus, a developer could provide an indication that they do not want more live analysis of that server or that NB test anymore. Then, processor 110 may delete log entries corresponding to that role. If there is a specific test that is consuming too many resources, the developer may stop the test via an indication to XPC 136.

Figure 4:
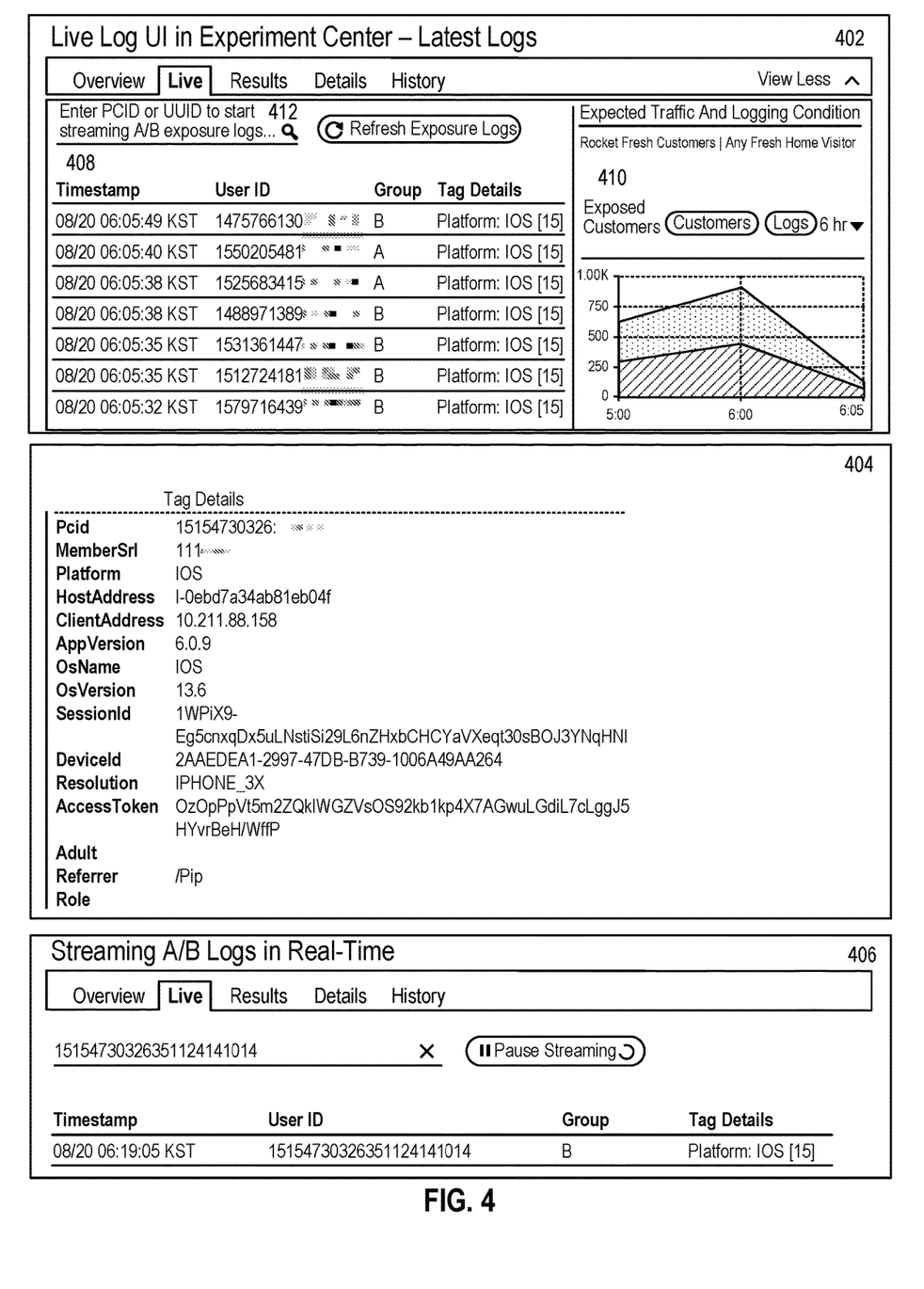
FIG. 4 is a diagram illustrating an exemplary embodiment of a graphic user interface (GUI) for analysis of virtual server logs, consistent with the disclosed embodiments.

FIG. 4 is a diagram illustrating an exemplary embodiment of a graphic user interface (GUI) for analysis of virtual server logs, consistent with the disclosed embodiments.

Consistent with this disclosure, in FIG. 4 processor 110 may run a GUI in XPC 136 and produce website instances 402, 404, and 406. Processor 110 may receive log entries and display them in the order they are received in or another order which may be determined by the developer, as shown in section 408. Section 408 may include log details, such as a timestamp, user ID, group identifier, and other details about the platform used to access for the NB test. Additionally or alternatively, processor 110 may display summary statistics relating to the received log entries, as shown in section 410. For example, processor 110 may determine how many customers have been exposed to each test version in a plurality of test versions and display an exposure ratio between the tests. Instance 404 illustrates an exemplary embodiment of a detailed view of a unique log presented when a user actuates an interface element or link in section 408 for a particular log entry.

In section 412, the developer may input a user ID, a category ID, or any such identifier to stream the NB test logs related to the identifier. If a developer were to make modifications to the test versions, this would allow the developer to see the effects of these changes in real-time and determine whether the test is being executed adequately. For example, in instance 406, a developer has input user ID "1515473032635112441014" corresponding to a unique customer device. This customer device is participating in test version "B" on an iOS device and the latest data from this device was received at 06:19:05 KST on August 20. The developer would now be able to make modifications to this device's test through a different platform and observe the effects of those changes in real-time through XPC 136, enabling the developer to see if the changes are having the desired effect.

In some embodiments, operations further comprise constructing a query to determine error types recorded in logs, stopping a test version when a fatal error is encountered, retrieving a file to resolve the fatal error, uploading the file to virtual servers configured to operate the test version, resuming operation of the test version. In some embodiments, a developer has a website code that refers to a file name, but the developer has forgotten to upload that file to the virtual servers. As a result, there is a "file not found" error and the virtual server might stop responding. Instead of not responding and crashing, the virtual server may proactively retrieve the missing file and continue operations.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for live analysis of virtual server logs, the system comprising:
   a memory storing instructions; and
   at least one processor configured to execute the instructions to perform operations comprising:
      receiving a plurality of log entries comprising test data and metadata created based on requests sent by consumer devices;
      processing the plurality of log entries, wherein processing the plurality of log entries comprises determining test versions corresponding to the plurality of log entries based on the test data;
      storing the processed plurality of log entries in a database having an inverted index;
      comparing an exposure ratio to a range, the exposure ratio being based on a first amount of log entries associated with a first test version and a second amount of log entries associated with a second test version, and the range comprising a target ratio; and
      upon determining the exposure ratio is outside of the range, directing at least one request from a consumer device to a default test version.

2. The system of claim 1, wherein determining test versions corresponding to the plurality of log entries comprises:
   parsing the received plurality of log entries; and
   for each log entry of the plurality of log entries, retrieving a portion of the test data associated with the test version.

3. The system of claim 1, wherein the test data comprises at least one of a timestamp, virtual server identifier, user identifier, device type, error code, or event type.

4. The system of claim 1, wherein terms of the inverted index comprise user identifiers, and documents of the inverted index comprise remaining items of a corresponding log entry.

5. The system of claim 3, wherein the operations further comprise:
   receiving a request to filter the returned test data, metadata, and statistics based on the user identifier of the log entries; and
   displaying the filtered test data, metadata, and statistics on the GUI.

6. The system of claim 1, wherein the operations further comprise:
   receiving a query from a user device, the query comprising a request to view the test data and metadata and statistics related to one or more log entries of the plurality of log entries;
   returning the test data, the metadata, and the statistics related to the one or more log entries; and
   displaying the test data, the metadata, and the statistics on a graphic user interface (GUI) that may be accessed by a user.

7. The system of claim 1, wherein the operations further comprise:
   retrieving log history from the database corresponding to a device type;
   determining an error code frequency for a first test version in the retrieved log history; and
   directing requests originating from a user device belonging to the device type to virtual servers operating a second test version when the error code frequency for the first software version exceeds a threshold.

8. The system of claim 1, wherein the operations further comprise:
   receiving an indication that a live analysis of the plurality of log entries for a role is not desired;
   determining a set of identifiers of virtual servers operating a test version; and
   deleting the plurality of log entries having an identifier among the set of identifiers.

9. The system of claim 1, wherein the operations further comprise:
   constructing a query to determine error types recorded in logs;
   stopping a test version when a fatal error is encountered;
   retrieving a file to resolve the fatal error;
   uploading the file to virtual servers configured to operate the test version; and
   resuming operation of the test version.

10. A computer-implemented method for live analysis of virtual server logs, the method comprising:
   receiving a plurality of log entries comprising test data and metadata created based on requests sent by consumer devices;
   processing the plurality of log entries, wherein processing the plurality of log entries comprises determining test versions corresponding to the plurality of log entries based on the test data;
   storing the processed plurality of log entries in a database having an inverted index;

comparing an exposure ratio to a range, the exposure ratio being based on a first amount of log entries associated with a first test version and a second amount of log entries associated with a second test version, and the range comprising a target ratio; and upon determining the exposure ratio is outside of the range, directing at least one request from a consumer device to a default test version.

11. The method of claim 10, wherein determining test versions corresponding to the plurality of log entries comprises:
parsing the received plurality of log entries; and
for each log entry of the plurality of log entries, retrieving a portion of the test data associated with the test version.

12. The method of claim 10, wherein the test data comprises at least one of a timestamp, virtual server identifier, user identifier, device type, error code, or event type.

13. The method of claim 10, wherein terms of the inverted index comprise user identifiers, and documents of the inverted index comprise remaining items of a corresponding log entry.

14. The method of claim 12, further comprising:
receiving a request to filter the returned test data, metadata, and statistics based on the user identifier of the log entries; and
displaying the filtered test data, metadata, and statistics on the GUI.

15. The method of claim 10, further comprising:
receiving a query from a user device, the query comprising a request to view the test data and metadata and statistics related to one or more log entries of the plurality of log entries;
returning the test data, the metadata, and the statistics related to the one or more log entries; and
displaying the test data, the metadata, and the statistics on a graphic user interface (GUI) that may be accessed by a user.

16. The method of claim 10, further comprising:
retrieving log history from the database corresponding to a device type;
determining an error code frequency for a first test version in the retrieved log history; and
directing requests originating from a user device belonging to the device type to virtual servers operating a second test version when the error code frequency for the first software version exceeds a threshold.

17. The method of claim 10, further comprising:
receiving an indication that a live analysis of the plurality of log entries for a role is not desired;
determining a set of identifiers of virtual servers operating a test version; and
deleting the plurality of log entries having an identifier among the set of identifiers.

18. The method of claim 10, further comprising:
constructing a query to determine error types recorded in logs;
stopping a test version when a fatal error is encountered;
retrieving a file to resolve the fatal error;
uploading the file to virtual servers configured to operate the test version; and
resuming operation of the test version.

19. A computer-implemented method for live analysis of virtual server logs, the method comprising:
receiving a plurality of log entries from a plurality of virtual server providers performing an NB test on test users, the plurality of log entries corresponding to virtual servers and comprising a virtual server identifier and an event identifier;
processing the plurality of log entries, wherein processing the plurality of log entries comprises determining which of an A test version or a B test version is running on each virtual server;
storing the processed plurality of log entries in a database having an inverted index;
constructing a query to determine a first number of A test version events of a type and a second number of B test version events of the type;
comparing an event ratio to a range, the event ratio being a ratio of the first number over the second number, and the range including a target ratio; and
upon determining the event ratio is outside of the range, directing at least one request from a consumer device to a default test version.

20. The method of claim 19, wherein determining test versions corresponding to the plurality of log entries comprises:
parsing the received plurality of log entries; and
for each log entry of the plurality of log entries, retrieving a portion of the test data associated with the test version.

* * * * *